April 4, 1967

M. E. HODGE 3,311,985

FRICTION WHEEL MEASURING APPARATUS

Filed Aug. 2, 1966

INVENTOR.
MERVILLE E. HODGE
BY
Christie, Parker & Hale
ATTORNEYS.

April 4, 1967   M. E. HODGE   3,311,985
FRICTION WHEEL MEASURING APPARATUS
Filed Aug. 2, 1966   5 Sheets-Sheet 3

INVENTOR.
MERVILLE E. HODGE
BY
Christie, Parker & Hale
ATTORNEYS.

April 4, 1967  M. E. HODGE  3,311,985
FRICTION WHEEL MEASURING APPARATUS
Filed Aug. 2, 1966  5 Sheets-Sheet 4

INVENTOR.
MERVILLE E. HODGE
BY
Christie, Parker & Hale
ATTORNEYS.

April 4, 1967 M. E. HODGE 3,311,985

FRICTION WHEEL MEASURING APPARATUS

Filed Aug. 2, 1966 5 Sheets-Sheet 5

INVENTOR.
MERVILLE E. HODGE
BY
*Christie, Parker + Hale*
ATTORNEYS.

3,311,985
FRICTION WHEEL MEASURING APPARATUS
Merville E. Hodge, Altadena, Calif., assignor to Primus Mfg., Inc., San Lorenzo, Puerto Rico, a corporation of California
Filed Aug. 2, 1966, Ser. No. 575,209
18 Claims. (Cl. 33—141)

This application is a continuation-in-part of my United States patent application Ser. No. 359,538 filed Mar. 11, 1964, now abandoned, which in turn was a continuation-in-part of United States patent application Ser. No. 153,-250 filed Nov. 13, 1961, now abandoned, which in turn was a continuation-in-part of United States patent application Ser. No. 784,834 filed Dec. 16, 1958, now abandoned.

This invention relates to apparatus for measuring movement along a surface, such as the relative movement of a first member along the surface of a second member. The invention has particular reference to a measuring accessory which incorporates a friction drive wheel adapted to be engaged in rolling contact with the surface along which measurements are to be made. The accessory of the invention is designed primarily for use on machine tools where, in response to relative travel between first and second guiding members of the machine tool, the apparatus provides, for example, a measurement of the relative travel between the cutting member of the machine tool and the work being machined, such as on engine lathes, milling machines, shaving machines, drill presses, and the like.

Practically all machine tools include a pair of guiding members, one of which moves relative to the other to produce relative travel between the cutting member and the work. For example, such a pair of guiding members may be the carriage and the bed of an engine lathe. Another such pair of guiding members may be the carriage and the cross feed on the carriage of an engine lathe. These guiding members usually have one or more flat machine surfaces extending along the direction in which they move relative to one another.

Prior to my invention, resort was had to micrometers and rod-actuated dial indicators intended for measurements over a limited range. Such devices require expensive semi-permanent installations for extended range precision measurements. There has long existed a need, however, for a compact measuring instrument which provides an accurate direct reading to within one-thousandth of an inch, which has unrestricted range of measurement, and which is easy to install on existing machine tools and to transfer from one machine tool to another. High hopes for solving this problem by means of a friction wheel type of measuring device have never been realized because for one reason or another such devices have not operated with sufficient accuracy and reliability.

In the manufacturing industry, particularly in machine shops, there has long existed a need for a portable measuring accessory which provides an accurate direct reading to within this one-thousandth inch tolerance. Further, the requirement is for a measuring apparatus having such an accuracy over a measurement range sufficient to accommodate the amount of travel available on existing machines. Mounting of such a device should require no expensive or unusual modifications or additions to the machines.

There is no known conventional measuring apparatus which combines these characteristics. While a conventional friction wheel type apparatus inherently has an unlimited range of measurement, those presently known do not operate with sufficient accuracy and reliability, particularly when in the presence of oils, metallic particles, and other foreign materials prevalent on some areas of machine tools. Moreover, the mounting means and the means for indicating the measurement values heretofore incorporated in friction wheel apparatus designed for use on machine tools are inadequate in view of the requirements set out. This can be attributed to the fact that the requirements for convenience, compactness, accuracy, and moderate cost are competing.

By utilizing a new and different construction for friction wheel measurement apparatus, as compared with the way apparatus previously has been constructed for use on machine tools, I have been able to combine into one device the competing characteristics required to fill the needs mentioned. Accordingly, the present invention contemplates a friction wheel type measuring instrument and cooperating means for mounting the same on a machine tool. The measuring instrument, incorporating a plurality of direct reading measurement indicators, is so designed that it may be manufactured and assembled at moderate cost in compact embodiments having a measurement accuracy reliable to within one part in six thousand. Cooperating mounting means for mounting the instrument on a machine tool is especially designed so that the instrument may be engaged and disengaged therefrom with a minimum of difficulty without affecting the orientation of the instrument relative thereto.

General speaking, the measuring instrument of the invention includes a housing which provides a protective enclosure for the operating mechanism. The housing defines a precision reference surface exactly parallel to the plane of rotation of a contact wheel; the reference surface is in an accessible position at the top of the housing. In a presently preferred embodiment the housing has an interior chamber and a front opening. At least two shafts, a main shaft and a secondary shaft, are rotatably journalled in the housing and extend vertically across the interior in spaced parallel relationship with their upper ends protruding through the top of the housing. The contact wheel is fixed coaxially of the main shaft, with the rim of the wheel protruding slightly past the front face of the housing through the opening therein. The protruding rim of the contact wheel is engageable in rolling contact with surfaces along which measurements are to be made. A plurality of rotary drive means, preferably in the form of precision gears, interconnect the shafts. A plurality of measurement indicators are located on top of the housing and are fixed to the protruding ends of the shafts respectively for direct rotation therewith.

In one embodiment of the invention, the housing comprises a top member and a mating bottom member. There are first, second and third shafts cooperating with first, second and third measurement indicators, respectively. Each measurement indicator includes a dial-type scale disposed concentric with the associated shaft, a scale referencer and means providing relative motion between the scale and the scale referencer. The relative motion means may also be referred to as a scale indexing member. The scale indexing member is connected to the shaft for direct rotation therewith. The measurement indicators indicate the amount of travel of the contact wheel in terms of fractions and multiples of a linear unit of measure, such as inches or centimeters.

The contact wheel has an outside diameter nearly equal to the width of the housing. It is disposed concentric to the first shaft in a manner permitting no angular or axial displacement relative to the shaft. The wheel has a circumference which is exactly an integral number N of said measuring units in length thereby permitting the scale of the first measurement indicator to be graduated in an integral number of measuring units. The angular motion amplification ratio, often denoted as gear ratio, between the first and second shafts is N:1, whereby the second shaft makes a complete revolution for each measuring unit traversed by the contact wheel. The measuring indicator associated with the third shaft has a relatively large circular scale formed on an annular member which passes between the first and second measurement indicators, the outside diameter of which is about the same as the width of the housing. Preferably the ratio of angular motion amplification between the second and third shafts is 10:1 so that the relatively large circular scale of the third measurement indicator can be graduated to read directly in both hundredths and thousandths of the measuring unit. The second measurement indicator preferably is graduated in tenths of measuring units.

Further, in the preferred embodiment of the invention, a compressible wiper is supported across the front face of the housing and surrounds the protruding rim of the contact wheel, extending at least across the top and both sides thereof. The front face of the housing is preferably substantially flat with the wiper being formed on an integral leaf spring having opposite arms which extend forward from the face of the housing. This makes the wiper easily replaceable, and prevents it from losing its effectiveness as a result of wear and compaction. The front face of the housing forms a strong backing for the wiper and, with the rim of the contact wheel protruding only slightly from the protective housing and with the wiper surrounding the protruding rim at least across the top and both sides, engagement of the instrument with the surface along which measurements are to be made effectively seals the operating mechanism of the instrument from contact with oils, metallic particles and other foreign materials.

I have discovered that among the factors affecting the accuracy of conventional friction wheel measuring apparatus, one main fault lies with wheel slippage resulting from inadequate measures taken to maintain the plane of the contact wheel parallel to the direction of movement during operation. For example, I have found that with the contact wheel having a circumference of six inches, the plane of the wheel must be maintained parallel to the direction of movement to within about two minutes of arc measure, in order to maintain an accuracy of measurement of within one one-thousandth inch per revolution of the wheel. Any skew tracking of the contact wheel along the surface of the second member of the machine produces error. With the force at which the wheel is urged against the measurement surface, as discussed in greater detail hereinafter, a hysteresis loop results when the measuring wheel deviates from parallelism with the direction of travel materially in excess of the limit specified.

To cope with this problem, I have developed a mounting which supports the instrument from the bottom for movement along a straight path, rather than from the side for movement around a pivot axis as in conventional mountings. Also, the mounting of the invention has the characteristic that the measuring instrument may be adjustably positioned thereon, without changing the planned orientation of the instrument relative to the mounting and hence relative to the machine tool to which the mounting is designed to be connected. The mounting is also characterized by the ease with which the instrument may be removed and attached thereto, again without altering the planned orientation of the instrument. This becomes particularly important when it is considered that this characteristic permits several mountings to be properly oriented and located on different spots on the same machine, or on different machines, and one measuring instrument employed in any of the mountings as needed.

Accordingly, the cooperating mounting of the invention includes a base adapted to be connected to a machine tool, a carriage, means engaging the carriage on top of the base so that the carriage is slidable with respect to the base back and forth along a single straight path without changing its orientation relative to the base, means spring loading the carriage in one direction along said path, means for retracting the carriage against the spring load along said path, and means for releasably connecting a measuring instrument on top of the carriage. Preferably, means are included to provide a visual indication of a predetermined spring loading so as to insure against wheel slippage resultant from improper or inadequate loading.

The mounting is of course designed to be connected to one guiding member of a machine tool adjacent the surface of another guiding member along which measurement is to be made. As the orientation of the mounting relative to the measurement surface determines the orientation of the instrument relative thereto, which is critical, there is included in the preferred embodiment of the mounting of the invention a means for connecting the base to the machine tool member which includes means for smoothly adjusting the orientation of the base relative to the machine tool.

The present invention contemplates a cooperative combination of the measuring instrument with the mounting, wherein the top of the carriage and the bottom of the instrument housing have mating surfaces which precisely determine an orientation of the instrument with respect to the mounting, and wherein there in included means for releasably fixing the instrument housing on the carriage with said mating surfaces in intimate contact. Preferably, the mating surfaces of the housing and carriage are arranged for sliding engagement along a single direction, so that the housing may be adjustably positioned along this direction on the carriage with the mating surfaces remaining in contact, and hence without changing the orientation of the instrument relative to the mounting. The means for fixing the instrument housing on the carriage is preferably a clamping arrangement connected to the carriage.

The cooperation between the instrument and the mounting as set out permits the instrument to be engaged and disengaged from various mountings without changing the orientation of the contact wheel relative to the measurement surface. Also, unlike the cooperation between the conventional instrument and its pivotal mounting, the adjustment of the position of the instrument relative to the carriage permits a considerable latitude in the distance at which the mounting of the invention may be disposed from the measurement surface. This makes it easier to properly locate and orient mountings on machine tools. Actually, many environments in which my invention finds utility are wholly incompatible with a pivoted mounting.

The foregoing measuring instrument and mounting structure is a unique combination of design factors, whereby the desired characteristics previously set out are obtained. Other advantages of the structural design, additional features thereof, and the cooperation between the instrument and the mounting, are taken up in detail with reference to a preferred embodiment of the invention shown in the accompanying drawings, in which:

Figure 1:
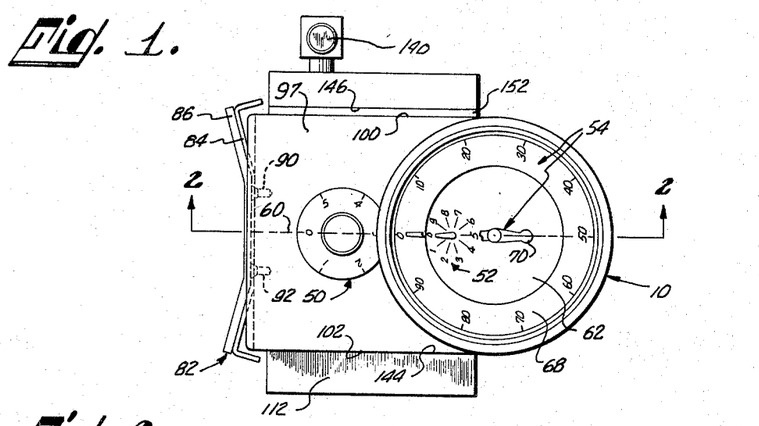
FIG. 1 is a plan view of the measuring instrument supported on the mounting.
Figure 2:
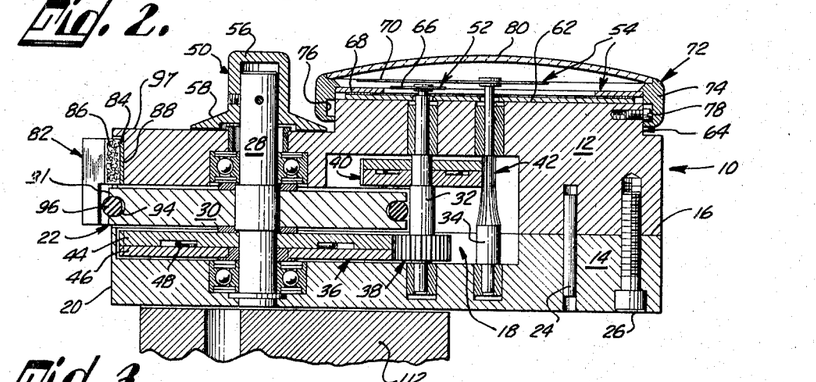
FIG. 2 is an enlarged fragmentary sectional elevation taken along line 2—2 of FIG. 1.

Referring now to the drawings, particularly to FIGS. 1 and 2, the operative mechanism of the measuring instrument is substantially contained by a protective instrument housing 10. The housing 10 is made from a top member 12 and a bottom member 14, the members having mating peripheral surfaces such as shown at 16 which lie in a plane paralleling the plane of rotation of the contact wheel. The top and bottom housing members fit together to define therebetween an interior chamber 18 which opens centrally through the front face 20 of the housing, as indicated at 22. The upper and lower housing members are accurately located relative to one another by means of a plurality of guide pins, such as pin 24. The housing members are held together by means of a plurality of machine screws, such as screw 26.

A first or main shaft 28 is journaled in the top and bottom housing members and extends vertically across the interior chamber. A metering wheel 30 is fixed axially on the first shaft intermediate the top and bottom housing members, with the rim 31 of the wheel protruding slightly past the front face of the housing through the opening 22 therein, so that it may be engaged with surfaces along which measurements are to be made. Second and third shafts 32, 34, called secondary shafts, are disposed on centers spaced rearwardly from the first or main shaft 28 along a straight line. The second and third shafts are journaled in both the top and bottom housing members in bearings as shown, and are oriented in spaced parallel relationship with one another and with the first shaft. Maximizing the diameter of the metering wheel 30 within the limits established by the overall size of the device helps minimize the error of the wheel, bearing in mind that in this type of instrument error is cumulative with each revolution of the wheel.

A first driving gear 36 is connected on the first shaft and meshes with a driven gear 38 connected on the second shaft. A second driving gear 40 is connected on the second shaft and meshes with a geared portion 42 on the third shaft. As can be seen, each of the driving gears 36 and 40 is made up of several parts. Thus, the first driving gear 36 includes an upper half or gear 44 fixed on the first shaft and a lower half or gear 46 rotatably connected on the first shaft, and a spring loop 48 connected at one end to the upper gear and at the other end to the lower gear. Thus, the driving gear 36 when meshed in a cocked condition with the driven gear 38 on the second shaft exerts a grip on the teeth of this driven gear so that there is no lost motion when the direction of the drive gear reverses as a result of a reversal in the direction of rotation of the metering wheel. The second drive gear 40 is similarly constructed, so that there is no lost motion between the second and third shafts upon a reversal of the driving direction. Thus the second and third shafts 32 and 34 follow exactly the rotary motion of the first shaft 28 as modified by the gear ratios relative to the first shaft 28.

The measuring instrument is designed to provide a direct reading in terms of fractions and multiples of a recognized linear unit of measure, such as inches or centimeters. To facilitate and simplify the arrangement necessary to accomplish this, the circumference of the metering wheel is exactly an integral number N of measuring units in length, and the gear ration between the first driving gear 36 and the driven gear 38 is 1:N, with the gear ratio between the second driving gear 40 and the driven gear portion 42 on the third shaft being 1:10. Thus, as the contact wheel 30 turns through one measuring unit length on its circumference, the second shaft makes one revolution, and the third shaft makes ten revolutions. This permits first, second and third measurement indicators 50, 52, 54 to be connected directly to the first, second and third shafts respectively without the necessity of intermediate gearing, and with the first measurement indicator reading in units, the second indicator reading in tenths of units, and the third measurement indicator reading in hundredths and thousandths of units. In order to achieve the requisite accuracy from the instrument, it is preferable that the gear ratios be exactly as specified above to provide a minimum number of parts. Reducing the parts reduces the possibility of error.

Each measurement indicator has a circular or radial type scale, that is, a scale with an integral number of divisions over a range of 360°, a scale referencer, and a scale indexing member. Thus, the first measurement indicator 50 comprises a scale indexing member in the form of a cap 56 connected to an upper protruding portion of the first shaft 28 so that the cap rotates directly with the shaft. The cap has an annular flange 58 on which there is marked a graduated scale having six equal divisions over the 360° range in accordance with the fact that the circumference of the metering wheel is exactly six measuring units in length, typically six inches for the American market. The scale on the flange 58 cooperates with an index mark or scale referencer 60 engraved in the top of the housing in line with the shaft centers.

The second measurement indicator 52 comprises a circular type scale of ten equal divisions marked on a plate 62 fixed to the top of a raised circular portion 64 of the upper housing member 12. The raised portion is centered with respect to the third shaft and located at the top rear of the upper housing member. The circular scale of the second measurement indicator 52 is centered with respect to the second shaft 32, and a cooperating scale indexing member in the form of a pointer 66 is fixed to an upper protruding portion of the second shaft for direct rotation therewith. The scale referencer is the tip 67 of the pointer 66.

The third measurment indicator includes a relatively large circular scale marked on an annular member 68 which is centered with respect to third shaft 42 and which passes between the scales of the first and second measurement indicators 50, 52. The scale on the annular member 68 comprises one hundred equal divisions spaced around the 360° range, this scale cooperating with a relatively long indexing member or pointer 70 fixed on an upper protruding portion of third shaft 42 for direct rotation therewith. Here again, the referencer is the tip 71 of pointer 70.

The annular member 68 of the third measurement indicator forms part of a rotatable bezel 72, the bezel being rotatably mounted on the circular raised portion 64 of the upper housing member 12. The bezel includes a main body member 74 in the form of a ring, this member being retained on the raised circular portion of the upper housing member by means of interior slot, indicated at 76, which extends around the lower portion of the interior periphery of the ring, in cooperation with a plurality of machine screws connected to the housing and arranged to ride in the slot, such as the screw illustrated at 78. The ring member 74 of the bezel supports a crystal 80 over the face of the second and third measurement indicators, thereby protecting the pointers, and generally keeping the indicators free from foreign materials prevalent around machine tools. The crystal 80 may be made of any suitable transparent plastic, or it may be glass. Both the wheel 30 and the diameter of dial 54 are related to the width of housing 10 because this type of instrument must be kept very compact in order to be installable at locations on machine tools which were never intended to accommodate such an instrument.

Figure 3:
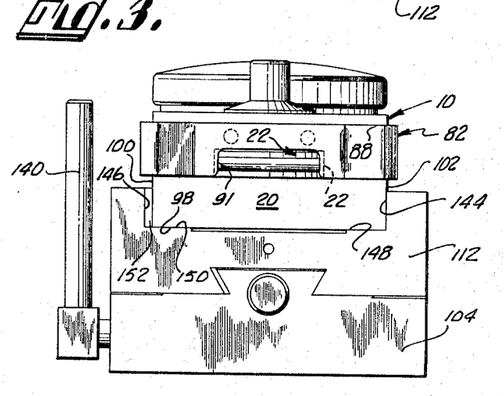
FIG. 3 is a front elevation of the measuring instrument and mounting of FIG. 1.

As can be seen in FIGS. 1 through 3, a wiper 82 is supported across the front face 20 of the housing, and surrounds the protruding rim of the metering wheel 30 across the top and both sides thereof. The wiper is composed of a single leaf spring 84 which is faced with a sheet of compressible wiper material 86. The wiper material may be connected to the spring by means of an adhesive, and is preferably a fibrous matter material such as felt. The spring-backed wiper is mounted in an accommodating slot 88 formed transversely in the face 20 of the housing, and is connected to the housing by means of a pair of machine screws 90, 92 disposed beneath the wiper material at opposite extremities of a central flat portion of the wiper. As is obvious from FIG. 1, the spring-backed wiper has opposite arms extending laterally from the central portion and sloping outwardly from the front face of the housing. As is best seen in FIG. 3, the wiper has a wide slot 91 formed in the bottom edge of its central portion, so that it surrounds the top and both sides of the protruding rim of the metering wheel. The sheet of wiper material is of sufficient uncompressed thickness thickness that its protrudes forwardly a short distance beyond the front face 20 of the housing and beyond the rim 31 of the metering wheel. When the accessory is urged into contact with a surface to be measured, the wiper material 86 compresses to allow the metallic rim 31 of metering wheel 30 to travel along the measurement surface (see FIG. 4).

Figures 4, 5, 6:
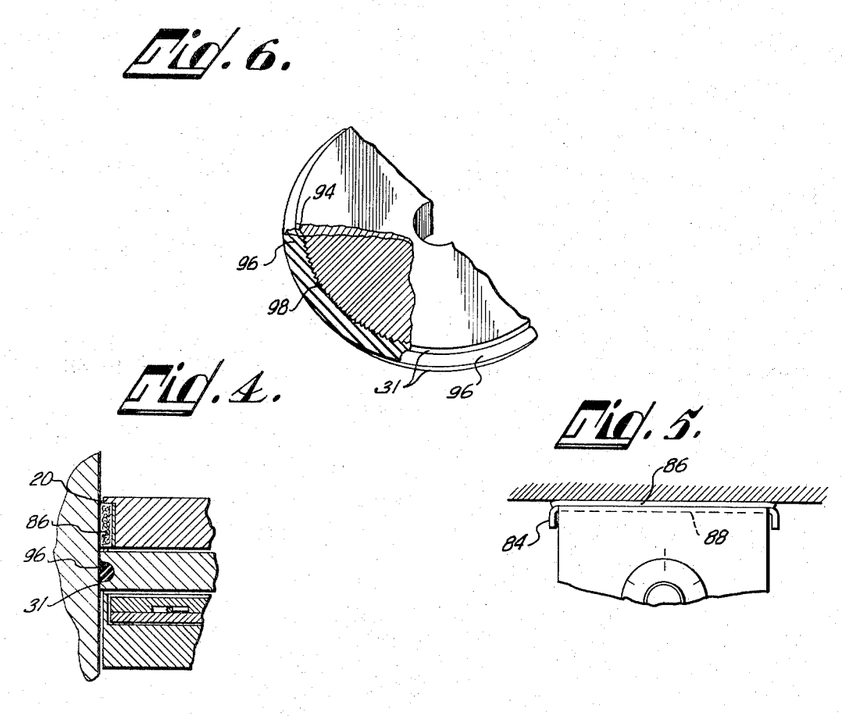
FIG. 4 is a schematic fragmentary sectional elevation of the front portion of the measuring instrument, illustrating the contact wheel in engagement with a measurement surface.
FIG. 5 is a schematic fragmentary plan view of the front portion of the instrument, illustrated in engagement with a measurement surface.
FIG. 6 is a fragmentary perspective drawing which illustrates the details of the contact wheel.

Referring to FIGS. 2 and 6, the metering wheel 30 is composed of any suitable metallic material having a low temperature coefficient of expansion so that its effective diameter is not sensitive to environmental conditions. A nickel steel commercially available under the trademark Invar has been found suitable for this purpose. The wheel 30 may be shunk or force fitted on shaft 28, or it may be fabricated integral with shaft 28. The contact wheel rim 31 is smooth and may have a central groove 94 extending around it. The peripheral distance around the rim 31 of wheel 30 is exactly N measuring units. An elastic annular friction member 96, preferably composed of neoprene rubber, is located in the groove 94 around the wheel 30 and protrudes slightly past the outer periphery or rim 31 of the wheel. The section of the friction member 96 is sufficiently smaller than the section of the groove 94 so that the friction member is compressible to within the confines of the groove at the point of rolling contact with a measurement surface. In this manner the rim 31 of the metering wheel engages the measurement surface and determines the effective diameter of the wheel. Sharp transverse serrations are formed on the contact wheel within the groove, as indicated at 98 in FIG. 6. These serrations offset any tendency of the friction member to flow with respect to the metering wheel and hence change the registration of the metering wheel with respect to the measurement surface, any change in registration being substantial considering the accuracy required of the instrument. The serrations are particularly effective, since at the point of rolling contact, the friction member is compressed against them.

As best seen in FIGS. 4 and 5, engagement of the measuring instrument with a measurement surface as indicated compresses the wiper material 86 and the friction member 96 at the point of contact to a position even with the rim 31 of the metering wheel. Thus, the metering wheel rim engages the measurement surface. The friction member provides sufficient friction to insure rotation of the metering wheel on the surface in the absence of effective metal-to-metal contact between the metering wheel and the measurement surface. The wiper effectively seals the metering wheel from foreign particles otherwise present on the surface or dropping from above. About 12 pounds of force is required to cause the metering wheel to engage the measurement surface in effective metal-to-metal contact so as to obtain faithful operation of the device under normal conditions, and about 40 pounds of force provides an optimum operating condition to insure a proper contact between the metering wheel and the measurement surface under extreme conditions. I have found that the friction member is not a necessary element where an operating force of not less than about 12 pounds is employed.

In order to achieve a uniform compression of the wiper material over its area, the backing surface provided by that portion of the front face of the housing forming the back surface of the slot 88 in which the wiper is mounted should be flat and disposed perpendicular to the plane of rotation of the metering wheel as shown. Such uniform compression insures that the measurement surface will always be wiped clean prior to engagement with the metering wheel. As the wiper material becomes worn and compacted, the pressure exerted by the flattened spring which backs the wiper material tends to maintain uniformity of wiper contact with the surface, so as to wipe the path of the metering wheel clean. The same applies when the front face of the instrument housing is located slightly out of parallel relationship with the plane of the measuring surface, in that the pressure exerted by the spring backing member of the wiper tends to compensate for the misalignment.

The instrument housing 10 has flat top and bottom surfaces 97, 98 disposed normal to the shafts and parallel with the plane of rotation of the metering wheel. The housing also has opposite side surfaces 100, 102 disposed parallel to one another throughout a substantial part of the length of the housing and disposed perpendicular to the bottom surface of the housing and to the plane of rotation of the metering wheel. As can be seen, the rear of the instrument housing is rounded off with the mentioned opposite side surfaces merging. As will be seen, the side and bottom surfaces of the housing cooperate with the mounting of the invention.

Both obtaining and maintaining a precise orientation of the measuring device relative to a measurement surface 164, and particularly the matter of parallel orientation of the metering wheel to the direction of movement along the measurement surface 164, is a critical factor not heretofore given adequate recognition. It is a factor bearing directly on the accuracy of the accessory instrument. Regardless of the precision and care with which the accessory itself is made, unless the critical orientation of the metering wheel 30 relative to the measurement surface 164 is obtained and maintained during operation, accuracy of the order of one one-thousandth of an inch per revolution of the metering wheel 30 is unattainable. To cope with this problem a mounting for the accessory is provided which supports the accessory from the bottom for movement along a straight path, rather than from the rear or side as in most conventional devices. Characteristic of the mounting is that the measuring instrument may be adjustably positioned thereupon without altering its planned orientation relative to the machine tool. The mounting is characterized by its stability and by the ease with which the instrument may be removed from and attached thereto, again without altering the planned orientation of the instrument relative to the machine tool. This becomes particularly important when it is considered that this characteristic permits several mountings to be properly mounted in different spots on the same machine, or on different machines, and one measuring instrument used on the mountings as needed.

Referring now to FIGS. 7 through 10, a measuring instrument mounting includes a base 104 having an upper protrusion 106 extending longitudinally thereof. The upper protrusion 106 has a uniform cross-section shaped like a truncated wedge which points downwardly. Co-planar precision flat top surfaces 108, 110 of base 104 parallel the wedge-shaped protrusion 106 on opposite sides thereof and cooperate with the protrusion to define a straight longitudinal path or way. These precision flat surfaces are referred to as lands. The protrusion 106 has an upper major planar surface 111 parallel to lands 108 and 110.

Figures 7, 8:
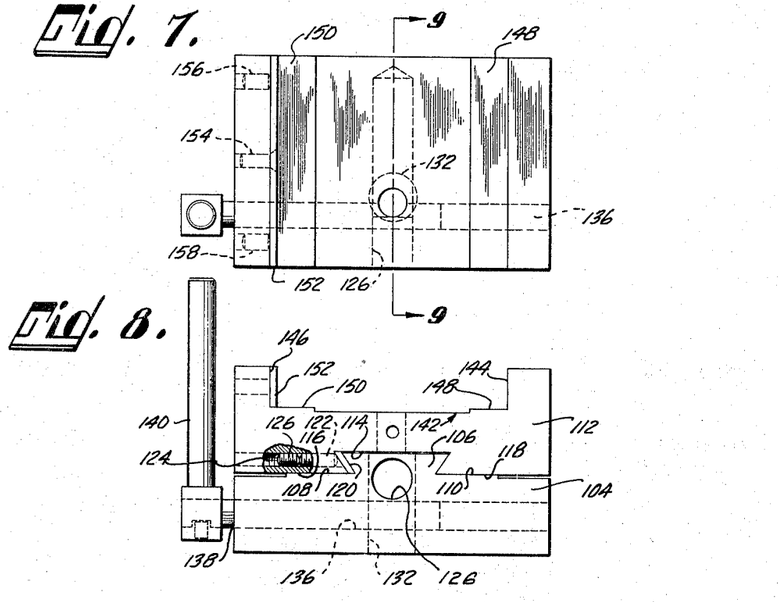
FIG. 7 is a plan view of the mounting of the invention.
FIG. 8 is a front elevation of the mounting of FIG. 7.
Figure 9:
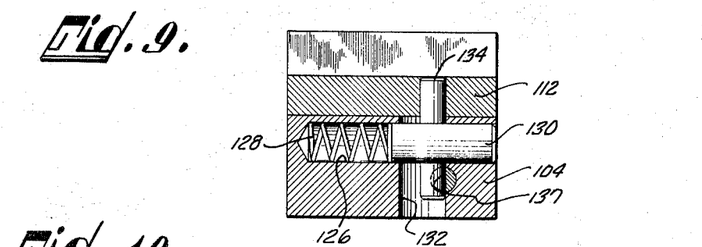
FIG. 9 is a sectional elevation of the mounting taken along line 9—9 of FIG. 7.

A carriage 112 having a wedge-shaped channel 114 formed in the bottom thereof is slidably engaged on the wedge-shaped protrusion 106 of the base 104 so that the carriage is retained slidably on the way defined by the lands 108 and 110 and wedge-shaped protrusion 106 on top of the base. The carriage has co-planar flat bottom surfaces 116, 118 which bear against the lands 108, 110 respectively on opposite sides of wedge-shaped protrusion 106. The surface of the carriage defining the base or upper extent of the channel 114 and which overlies the top surface 111 of wedge-shaped protrusion 106 of the base does not contact the protrusion upper surface 111. The carriage 112 is tightened down onto the base lands 108 and 110 by means of a pressure plate 120 which extends along one side wall of the wedge-shaped channel 114. The pressure plate is centrally connected to the carriage by means of a screw (not shown) which extends into the carriage. Pressure is exerted against the wedge-shaped protrusion or way 106 on the base by means of additional screws which extend laterally through the carriage toward the protrusion and bear against opposite ends of the pressure plate, one such screw being shown at 122 located in a threaded bore 124 and backed up by a locking screw 126 also located in the bore. Typically, the bore 124 opens through one side of the carriage so that access may be had to the screws for adjusting the pressure of the pressure plate against the wedge-shaped protrusion on the base. This arrangement will be more apparent with reference to the later description of an analogous arrangement on top of the carriage.

With the carriage tightened down onto the lands 108, 110, the carriage has only one degree of freedom with respect to the base, namely that enabling it to slide longitudinally of the base. The lands serve the important function of providing a stables means of preventing vertical wobble of the carriage about the longitudinal axis of the base without interfering with sliding of the carriage longitudinally of the base. The close sliding fit between the base 104 and the carriage 112 prevents any skewing or cocking of the accessory about a line perpendicular to the surface along which travel is to be gauged.

The base has a central longitudinal bore 126 which opens through the front of the base and which is closed at the rear of the base. A coil spring 128 is disposed co-axially in the rear portion of the longitudinal bore 126, and a spring rod 130 is slidably mounted in the front end of this bore and engaged with the coil spring. The base 104 also has a vertical bore 132 which intersects the longitudinal bore 126 and opens through both the top and bottom of the base, thus providing an upwardly extending opening and a downwardly extending opening from the spring rod 130. A vertical pin 134 extends through the spring rod 130, thereby defining an upper protrusion and a lower protrusion from the spring rod. The pin 134 is located in the vertical bore 132, and is relatively small in diameter compared to the diameter of the bore 132 so that it may move longitudinally of the base across the bore. By engaging the front surface of the vertical bore 132 (the surface of the base below the wiper 82 secured to the carriage 112), the pin 134 prevents the spring rod 130 from coming out the front end of the longitudinal bore 126 and thereby maintains the coil spring 128 in compression. The upper protruding portion of the pin 134 is engaged with the carriage 112 in a hole formed in the carriage along the base of the channel 114. The carriage is slidable rearwardly with respect to the base and against the load from the spring 128 for a maximum distance determined by the difference in the diameters of pin 134 and vertical bore 132. With this arrangement, full advantage is taken of the force available from the spring 128, which force should be at least about forty pounds. Additional force above forty pounds is unnecessary, but in no way detrimental.

The base also has a lateral bore 136 which intersects with a forward portion of the vertical bore 132. An operating rod 138 is rotatably mounted in the lateral bore 136, and extends across the front of the depending portion of the vertical pin 134. The operating rod has a flat slot 137 in it which is aligned with the depending portion of the pin 134 and which defines a cam portion on the rod for pushing the pin rearwardly when the rod is rotated. A lever arm 140 is connected to the operating rod exteriorly of the base. Actuation of the lever arm rotates the rod 138 causing the cam portion of the rod to engage the depending portion of vertical pin 134 and push the same, together with the spring rod 130 and the carriage 112, rearwardly with respect to the base against the action of the coil spring 128.

The flat slot in the operating rod 138 provides a quick cam action, so that rotation of the rod slightly in excess of 90° brings the round of the rod to bear against the vertical pin 134, whereupon restoring torque acts over-center of the cam portion and ceases to be effective to return pin 134 so that the lever arm 140 no longer need be held. The carriage is then in its retracted position on the base. Also, since the cam is formed by a slot in the operating rod, and since the lateral bore 136 extends completely through the base, the operating rod may be removed without difficulty for insertion from the opposite side of the base to serve the same purpose. This is true because the cam portion of the rod is no greater in size than the lateral bore. The accessory retraction mechanism is thus operable from either side of the base.

Figure 10:
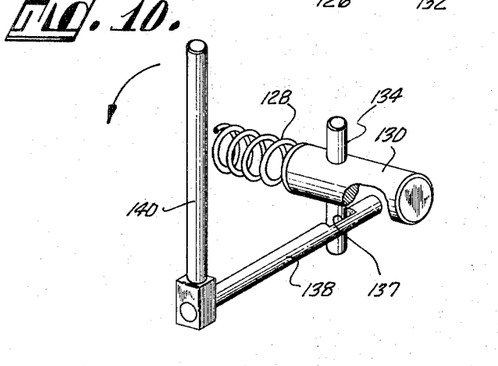
FIG. 10 is a schematic perspective drawing illustrating the relationship between operating parts of the mounting.

The basic relationship between the operating parts of the mounting, including the spring 128, the spring rod 130, the vertical pin 134, the operating rod 138, and the lever arm 140, is illustrated by the perspective drawing of FIG. 10.

As best seen in FIGS. 3, 7 and 8, the carriage 112 has a wide channel 142 formed in its top. The channel extends longitudinally of the carriage parallel to the longitudinal way on the base 104 and in effect defines a second way on top of the carriage. The channel has parallel vertical side walls 144, 146 and raised horizontal lands 148, 150 adjacent the respective side walls. A flat pressure plate 152 extends along one side wall 146 and defines the effective surface for this side wall of the channel. The plate is centrally connected to the side wall 146 by means of a machine screw 154. Opposite ends of the pressure plate 152 are adjustable outwardly from the side wall 146 by means of set screws 156, 158, respectively, mounted in the side wall adjacent opposite ends of the pressure plate in threaded bores which open through the side of the carriage so that access may be had to the screws for advancing them toward the underside of the pressure plate.

The mounting of the pressure plate 152 on the side wall 146 of the channel in the carriage is completely analogous to the mounting of the pressure plate 120 along the side wall of the wedge-shaped channel 114 in the bottom of the carirage. It should be observed that in accordance with the fact that the operating rod 138 can be removed and inserted in the opposite side of the base, similarly it is entirely permissible to have pressure plates disposed on both sides of the channel 114 in the bottom of the carriage. In this manner, all adjustments can be made from one side, and the side can be chosen at will as the most convenient in view of the position in which the mounting is to be located on any particular machine tool. This lends versatility to the mounting.

As best seen in FIGS. 1 and 3, the wide channel in the top of the carriage is shaped to fit the bottom of the instrument housing. The bottom surface 98 of the instrument housing meets with the flat lands 148, 150 on opposite sides of the channel, and the parallel vertical side surfaces 100, 102 of the instrument housing mate respectively with the surface of the pressure plate 152 and with the opposite side surface 144 of the carriage channel 142. These mating surfaces of the instrument housing and the carriage provide for movement of the instrument along a single direction with respect to the mounting, this direction being longitudinally of the mounting, and at the same time provide a very stable support for the instrument against movement in any other direction. Considering the fact that the instrument is to be engaged with a measurement surface at about forty pounds force, and then moved along the surface with the wiper 82 compressed between the instrument housing and the surface, it can be appreciated that the mating surfaces illustrated provide the required stable support without concentrating forces at any particular point on the instrument housing. Thus, the pressure plate 152 releasably fixes the instrument to the mounting, by means of the adjustment screws, and does so by bearing against the housing in a surface type, rather than a point type, contact. The pressure plate and associated adjustment screws act effectively as a clamping means for clamping the mating surfaces of the housing and carriage together. The orientation of the instrument relative to the mounting is not affected by changing the position of the instrument longitudinally of the mounting, because the mating surfaces are straight in the direction longitudinal of the base.

Figure 11:
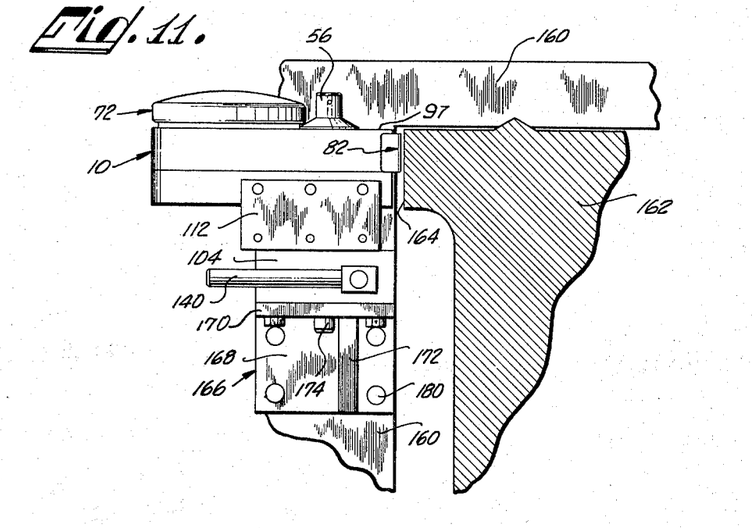
FIG. 11 is a side elevation of the measuring instrument, mounting, and means connecting the mounting to a machine tool, and illustrates the relationship with the measurement surface on the machine tool when the mounting carriage is in its retracted condition.
Figure 12:
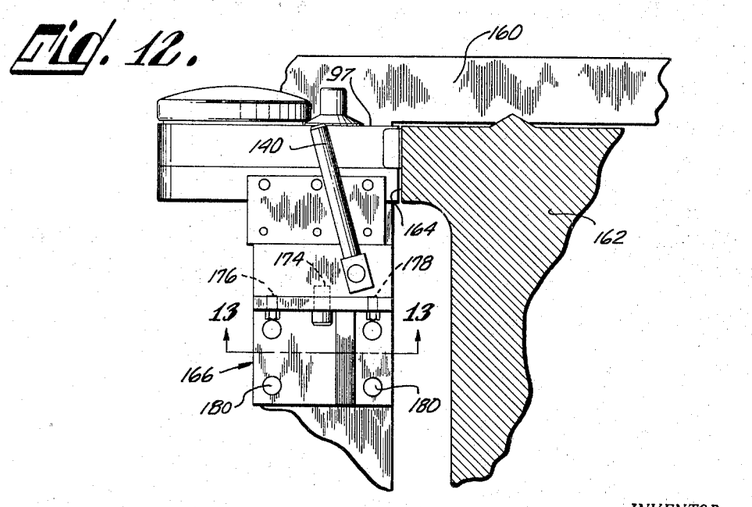
FIG. 12 is a view similar to FIG. 11 with the mounting shown in its released condition so that the measuring instrument is engaged with the measurement surface on the machine tool.
Figure 13:
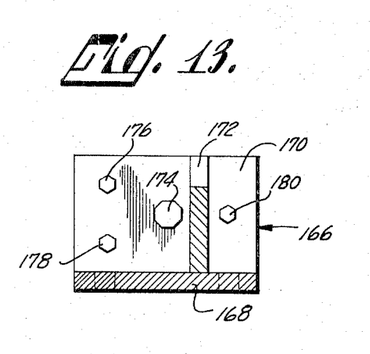
FIG. 13 is a bottom plan view, partly in section, of the means connecting the mounting to the machine tool, taken along line 13—13 of FIG. 12.

Referring now to FIGS. 11, 12 and 13, the measuring apparatus is shown connected to the carriage 160 of an engine lathe but the accessory is useful on almost any machine tool. The carriage is movable longitudinally of the bed 162 of the engine lathe in a direction normal to the sheet. The bed of the engine lathe has a flat machined surface 164 which extends along the direction of travel, and which is herein referred to as the measurement surface.

As can be seen, the base of the mounting is adapted to be connected to the carriage of the engine lathe by means of a bracket 166. The bracket includes a side plate 168, a top platform 170, and a reinforcing web 172. As is apparent, the base 104 has a flat bottom surface which abuts the flat top surface of platform 170 of the bracket. The base is held down onto the platform by means of a centrally located hold-down screw 174 extending upwardly through the platform and into the base. A plurality of set screws 176, 178 extend through the platform on opposite sides of the hold-down screw, and bear against the bottom of the base. By means of the hold-down screw and the set screws on opposite sides of the hold-down screw, the orientation of the base 104 relative to the bracket 166 is smoothly adjustable. If desired, hardened metal inserts (not shown) may be provided at the points where the set screws bear against the bottom of the base. Preferably, however, the base is case hardened on its bottom surface.

The procedure for mounting and using the apparatus is as follows: bracket 166 is rigidly connected to carriage 160 by machine screws 180 extending through side plate 168 as shown. The position of the bracket on the carriage is chosen so that the instrument, when mounted, lines up with the measurement surface 164 and so that platform 170 of the bracket lies as close as possible in a plane which is parallel to the direction of movement of the machine tool members and normal to the measurement surface 164. The mounting is then connected to the platform by means of hold-down screw 174, the instrument is inserted onto the carriage and clamped in place, and the mounting is leveled by means of the plurality of adjustment screws in the platform of the bracket so that the plane of rotation of the metering wheel in the instrument housing lies parallel with the direction of movement of the machine tool members within about two minutes of arc and normal to the measurement surface. This is easily accomplished because the top and bottom surfaces of the instrument housing, particularly the top surface, are exactly parallel to the plane of rotation of the metering wheel. Thus, the top surface of the housing affords an accessible reference surface for accomplishing this alignment. Having accomplished the alignment, and with the hold-down screw 174 firmly engaged, the instrument may be attached and detached at will from the carriage 112 without affecting the alignment of the metering wheel relative to the measurement surface, because of the cooperation between the mating surfaces of the carriage and the instrument housing.

In attaching the instrument to the mounting for purposes of making measurements, the carriage is moved to its retracted position on the base, as indicated in FIG. 11 by the position of the lever arm 140, and the position of the instrument longitudinally of the carriage is adjusted until the wiper 82 engages the measurement surface. The instrument is then clamped to the carriage. The lever arm is then moved forward to engage the instrument with the measurement surface.

In FIG. 12, the position of the instrument and carriage relative to the base is shown when the carriage is released with respect to the base, as indicated by the position of the lever arm 140. As can be seen, this compresses the wiper so that as previously discussed with respect to FIGS. 4 and 5 the periphery of the metering wheel comes into firm engagement with the measurement surface. Hence, about forty pounds pressure is carried through the instrument housing to the carriage and through the base and bracket to the carriage 160 of the engine lathe.

When the instrument is properly engaged with the measurement surface, the instrument holds the carriage slightly retracted on the base, taking the pressure off of operating rod 138 which previously held the carriage retracted on the base, so that the lever appears loose. The longitudinal position of the instrument relative to the carriage can be adjusted until this condition is obtained.

Figure 14:
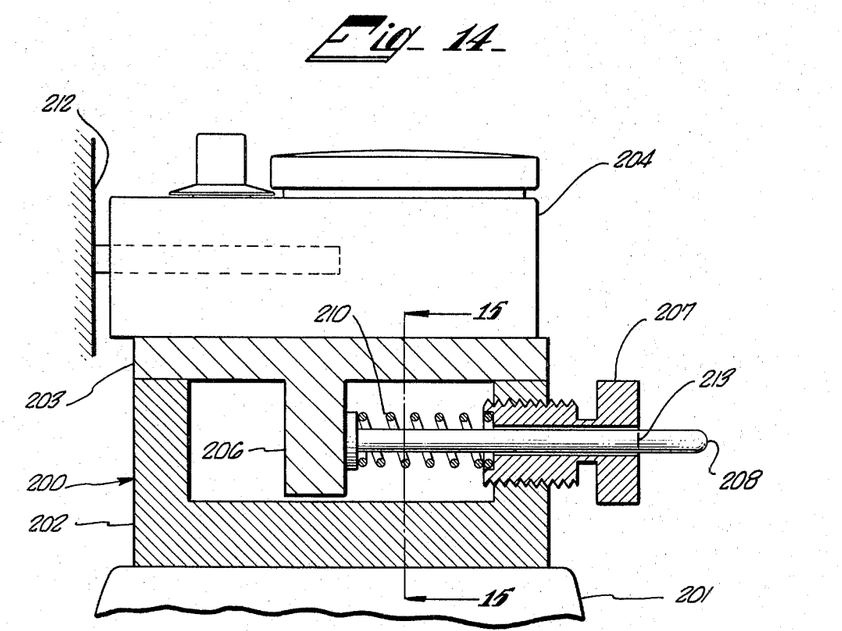
FIG. 14 is a longitudinal sectional elevation of an alternative mounting structure including calibrated means for indexing a predetermined loading.
Figure 15:
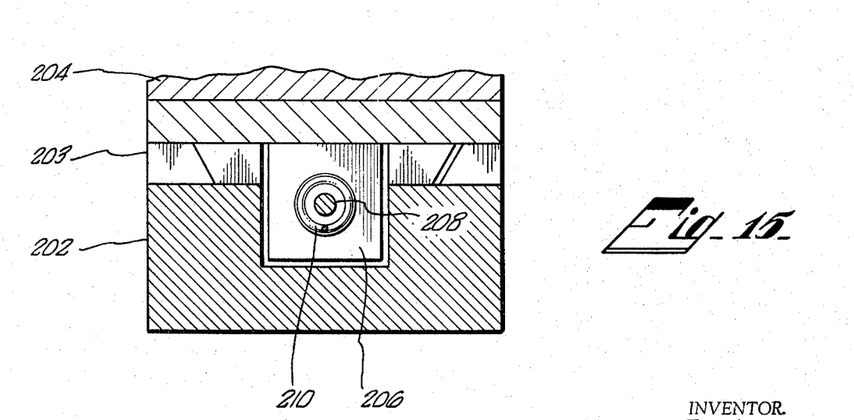
FIG. 15 is a transverse sectional elevation taken on the line 15—15 of FIG. 14.

As previously discussed, the manner and degree to which the metering wheel is spring-loaded against the machine surface is important to the accuracy and reproducibility of the measurements. I have now determined that it may be desirable to provide the user of the instrument with visual means for readily determining that adequate spring-loading has been applied. One such means for accomplishing this objective is shown in longitudinal sectional elevation of FIG. 14 anud in transverse sectional elevation in FIG. 15. Referring to these figures, a mounting member 200 is shown mounted on a member 201 of a machine tool, which mounting may be accomplished in any desired manner, as for example as shown in FIG. 11. The mount 200 includes a base 202 fastened to the machine tool part 201 and a carriage 203 to which is mounted a measuring instrument 204. The measuring instrument is of the type described in this application and may be mounted to the carriage 203 as shown schematically in FIG. 15 in the manner and as for example described with relation to FIGS. 3 and 8. The carriage 203 is in turn slidably mounted to the base 202 by a dovetail engagement as shown in FIG. 15. In this instance the dovetail is provided at opposite ends of the carriage and base and is broken in the central portion so that in assembly and disassembly of the mount, the carriage 203, which includes a depending load bearing member 206, can be inserted in or withdrawn from the base 202 by orienting the carriage and the base in one extreme end position or another and engaging or disengaging the interrupted dovetails by a sliding motion.

The rear wall of the mount 202 is threaded to receive an adjusting screw 207, this screw being bored to receive a load-indicating gauge rod 208. The rod 208 extends inwardly of the mounting base through the screw 207 and bears against the load-receiving member 206 forming a part of carriage 203. A loading spring 210 is confined between the member 206 and the inside face of the adjusting screw 207. The action of the confined load-spring 210 as shown in FIG. 14, is to drive the carriage 203 and the measuring instrument 204 in the direction of the surface 212 of the machine tool on which the metering wheel of the instrument 204 is to ride. As the adjusting screw is screwed inwardly or outwardly, the loading provided by spring 210 is respectively increased or decreased. By this construction it is a relatively simple matter to calibrate the gauge rod 208 as by a load-indicating mark 213 or a plurality of such marks if desired. This mark 213 may be inscribed by the manufacturer on the shaft in relation to the specifications of the spring 210 so as to give the user of the device a visual indication that the instrument 204 is properly loaded against the measuring surface when the adjusting screw is screwed inwardly to the point of coincidence with the mark 213. Until the adjusting screw is screwed in to the point of visibility of the load-indicating mark, the metering instrument will be inadequately loaded against the measuring surface. On the other hand, it is perfectly acceptable to advance the adjusting screw beyond the mark 213 since there is no adverse effect on the operation of the instrument if it is loaded significantly above a minimum required loading.

In the foregoing description and explanation, it has been pointed out that the alignment of the accessory relative to the measurement surface 164 is critical. If the line through the axes of shafts 28, 30 and 32 is vertically inclined to a line normal to the measurement surface, then the metering wheel 30 engages the measurement surface along the upper or lower limit of the wheel rim 31 and if this rim is flat the effective diameter of the wheel 30 is no longer related to the precision diameter of the wheel and larger than actual measurements will be indicated. If the line through the shafts 28, 32, and 34 is laterally inclined to a line normal to the measurement surface 164, then measurements obtained by relative travel of the accessory in one direction may not be exactly reproduced during relative travel in the other or opposite direction. If the plane of the metering wheel 30 is inclined to the plane of relative travel of the accessory, then force vectors are developed under the influence of the strong spring loading which can produce an unacceptable hysteresis in the forward and reverse travel of the unit. For these reasons it is critical that the combination of the accessory and its mounting have the cooperating precision relationships as set forth above. Ignorance of, or lack of appreciation for, these critical relationships has contributed greatly to the lack of acceptance of other friction wheel-type measuring accessories known prior to my invention.

In operation of the instrument, the retractable carriage serves an important function. Thus, it may be desirable to disengage the instrument from the measurement surface 164 without removing the instrument from the carriage. This is done in the carriage embodiment shown in FIG. 8 simply by retracting the lever arm 140. For example, one reason for doing this is to reset the instrument back to zero at a given position, which of course can not be done so long as the metering wheel remains in engagement with the measurement surface. Hence, the lever arm 140 is actuated, retracting the carriage on the base and disengaging the metering wheel from the measurement surface. Then, by means of the cap 56 which is exposed on top of the instrument housing and forms part of the first measurement indicator connected directly to the shaft that mounts the metering wheel, the metering wheel can be turned until all of the indicators indicate zero. The third measurement indicator is so sensitive that it is difficult to make it indicate zero by turning the cap 56. Hence, the cap 56 may be turned until the third measurement indicator indicates almost or near zero, and then the rotatable bezel 72 moved slightly one way or the other to index with the pointer of the third measurement indicator so that the reading is exactly zero. Thus, the instrument need not be dismounted from the carriage in order to reset its reading.

While the invention has been described above in conjunction with specific apparatus, this has been by way of example only and is not to be considered as a limitation to the scope of this invention.

What is claimed is:

1. In apparatus for measuring the relative travel of a first machine tool member along a surface of a second machine tool member, the combination comprising a friction wheel type measuring instrument which includes a protective housing having an opening through its front face and a contact wheel rotatably mounted in the housing with its rim protruding slightly past the front face of the housing through the opening therein so that it may be engaged in rolling contact with the measurement surface, and cooperating mounting means adapted to be connected to the first machine tool member for releasably mounting the instrument thereon and for orienting and positioning the instrument relative to the measuring surface, said mounting means including a base, a carriage, means engaging the carriage on top of the base so that the carriage is slidable with respect to the base back and forth along a single straight path and without changing its orientation relative to the base, means spring loading the carriage in the forward direction along said path, means including an externally accessible lever arm and a cooperating cam for retracting the carriage against said spring load rearwardly along said path and fixing the carriage in the retracted position, and means for releasably fixing the instrument housing on top of the carriage so that the contact wheel is engagable and disengagable with the measurement surface by operation of the retracting means, the instrument housing and the carriage having mating surfaces which determine a fixed orientation of the instrument relative to the base when the instrument is so fixed on the carriage.

2. Apparatus of claim 1 wherein the mating surfaces are slidably engageable along a single straight path so that the position of the instrument on the carriage may be changed along said path without altering the orientation of the instrument relative to the mounting.

3. In apparatus for measuring the relative travel of a first machine tool member along a surface of a second machine tool member, the combination comprising a friction wheel type measuring instrument which includes a protective housing having an opening through its front face and a contact wheel rotatably mounted in the housing through the opening therein so that it may be engaged in rolling contact with the measurement surface, the instrument housing having a bottom surface disposed parallel to the plane of rotation of the contact wheel and opposite side surfaces which extend parallel to one another for a substantial part of the length of the housing, and cooperating mounting means adapted to be connected to the first machine tool member for releasably mounting the instrument thereon and for orienting and positioning the instrument relative to the measuring surface, said mounting means including a base, a carriage, means engaging the carriage on top of the base so that the carriage is slidable with respect to the base back and forth along a single straight path and without changing its orientation relative to the base, means spring loading the carriage in the forward direction along said path, means including an externally accessible lever arm and a cooperating cam for retracting the carriage against said spring load rearwardly along said path and fixing the carriage in the retracted position, means defining an open channel extending across the top of the carriage and parallel to said straight path along which the carriage is movable on the base for receiving the instrument housing in sliding engagement with said bottom and side surfaces thereof, so that the position of the instrument housing along said channel may be changed without changing the orientation of the instrument relative to the mounting, and means for releasably fixing the position of the instrument housing in said channel.

4. Apparatus of claim 3 wherein the means for releasably fixing the position of the instrument housing in said channel comprises a pressure plate connected to the carriage and extending along one side wall of the channel for engaging the corresponding side surface of the instrument housing, and means for adjusting the plate inwardly in the direction transverse to the channel, so as to clamp the instrument housing in place without altering the orientation of the instrument relative to the mounting.

5. A friction wheel type measuring instrument for measuring distances along surfaces in terms of fractions and multiples of a recognized linear unit of measure comprising a protective housing having a front opening, a main shaft rotatably journaled within the housing with one end of the main shaft protruding upwardly from the top of the housing, a contact wheel fixed coaxially on the main shaft within the housing, the contact wheel having a rim which protrudes slightly from the front of the housing through the opening therein so that it may be frictionally engaged with surfaces along which measurements are to be made, the contact wheel having a circumference which is exactly an integral number N of said measuring units in length, a secondary shaft rotatably journaled within the housing and spaced rearwardly from said parallel to the main shaft, one end of the secondary shaft protruding upwardly from the top of the housing, a plurality of gears interconnecting the secondary shaft and the main shaft in a gear ratio of exactly ten N to one, primary and secondary measurement indicators located on top of the housing and associated with the main and secondary shafts respectively, each of said measurement indicators including a circular type scale disposed coaxially with the corresponding shaft, and each indicator further including a cooperating scale indexing member connected to the protruding end of the associated shaft for direct rotation therewith, and a cap mounted on the protruding upper end of the main shaft comprising the scale indexing member for the primary measurement indicator, the cap having a flange on which is marked the circular scale of the measurement indicator and being accessible from the exterior of the housing so it may be manually engaged to reset the primary measurement indicator.

6. Apparatus of claim 5 wherein the housing has a front face disposed perpendicular to the plane of rotation of the contact wheel, and further comprising a wiper which surrounds the protruding rim of the contact wheel on at least three sides, the wiper comprising a unitary leaf spring having a covering of wiper material on its front face, the spring having a central portion connected to the housing and extending across the front face of the housing above the protruding rim of the contact wheel, and having lateral arms extending from opposite ends of the central portion and slanting forwardly from the front face of the housing.

7. Apparatus of claim 6 wherein the front face of the housing has a shallow transverse recess therein, and wherein the central portion of the wiper is mounted in the recess in transverse alignment therewith so that the lateral arms of the wiper fit in the recess when compressed against the front face of the housing.

8. Apparatus of claim 7 further comprising a smoothly adjustable connecting means for rigidly supporting the mounting base on said first machine tool member and for smoothly adjusting the orientation of the mounting base relative thereto.

9. A friction wheel type measuring instrument for measuring distances along surfaces in terms of fractions and multiples of a recognized linear unit of measure comprising a protective housing having a front face and a front opening therein, a main shaft rotatably journaled within the housing with one end of the main shaft protruding upwardly from the top of the housing, a contact wheel fixed coaxially to the main shaft within the housing, the contact wheel having a smooth rim which protrudes slightly from the front of the housing through the opening therein so that it may be engaged with surfaces along which measurements are to be made, the contact wheel having a circumference which is exactly an integral number N of said measuring units in length, the housing front face being perpendicular to the plane of rotation of the contact wheel, a wiper on the front face surrounding the protruding rim of the contact wheel on at least three sides of the protruding rim, the wiper comprising a sheet of wiper material and leaf spring means secured between the wiper material and the housing for biasing the ends of the sheet of wiper material away from the housing against a surface with which the contact wheel is engaged, a secondary shaft rotatably journaled within the housing and spaced rearwardly from and parallel to the main shaft, one end of the secondary shaft protruding upwardly from the top of the housing, a plurality of gears interconnecting the secondary shaft and the main shaft in a gear ratio of exactly ten N to one, primary and secondary measurement indicators located on top of the housing and associated with the main and secondary shafts respectively, each of said measurement indicators including a circular type scale disposed coaxially with the corresponding shaft, and each indicator further including a cooperating scale indexing member connected to the protruding end of the associated shaft for direct rotation therewith.

10. A friction wheel type measuring instrument for measuring distances along surfaces in terms of fractions and multiples of a recognized linear unit of measure comprising a protective housing having a front face and a front opening therein, a main shaft rotatably journaled within the housing with one end of the main shaft protruding upwardly from the top of the housing, a contact wheel fixed coaxially on the main shaft within the housing, the contact wheel having a smooth rim which protrudes slightly from the front of the housing through the opening therein so that it may be engaged with surfaces along which measurements are to be made, the contact wheel having a circumference which is exactly an integral number N of said measuring units in length, wiper means on the housing front face including a sheet of wiper material on the housing front face beyond which the contact wheel rim protrudes and spring means disposed between the wiper material and the housing for biasing the ends of the sheet of wiper material away from the housing, a secondary shaft rotatably journaled within the housing and spaced rearwardly from and parallel to the main shaft, one end of the secondary shaft protruding upwardly from the top of the housing, a plurality of gears interconnecting the secondary shaft and the main shaft in a gear ratio of exactly ten N to one, primary and secondary measurement indicators located on top of the housing and associated with the main and secondary shafts respectively, each of said measurement indicators including a circular type scale disposed coaxially with the corresponding shaft, and each indicator further including a cooperating scale indexing member connected to the protruding end of the associated shaft for direct rotation therewith.

11. A friction wheel type measuring instrument for measuring distances along surfaces in terms of fractions and multiples of a recognized linear unit of measure comprising a protective housing having a front opening, a main shaft rotatably journaled within the housing with one end of the main shaft protruding upwardly from the top of the housing, a contact wheel fixed coaxially on the main shaft within the housing, the contact wheel having a smooth rim which protrudes slightly from the front of the housing through the opening therein so that it may be engaged with surfaces along which measurements are to be made, the contact wheel having a circumference which is exactly an integral number N of said measuring units in length, a secondary shaft rotatably journaled within the housing and spaced rearwardly from and parallel to the main shaft, one end of the secondary shaft protruding upwardly from the top of the housing, a plurality of gears interconnecting the secondary shaft and the main shaft in a gear ratio of exactly ten N to one, primary and secondary measurement indicators located on top of the housing and associated with the main and secondary shafts respectively, each of said measurement indicators including a circular type scale disposed coaxially with the corresponding shaft, and each indicator further including a cooperating scale indexing member connected to the protruding end of the associated shaft for direct rotation therewith, a cap mounted on the protruding upper end of the main shaft comprising the scale indexing member for the primary measurement indicator, the cap having a flange on which is marked the circular scale of the measurement indicator and being accessible from the exterior of the housing so it may be manually engaged to reset the primary measurement indicator, and a base for mounting the housing relative to a surface along which distance is to be measured, the top of the housing defining precision reference surface means disposed exactly parallel to the plane of rotation of the contact wheel and providing means for aligning the base so that the instrument mounted to the base has the contact wheel disposed in a proper orientation relative to the surface along which distance is to be measured.

12. Apparatus for indicating motion between two relatively moving parts of a device, one of said parts having a measurement surface, the apparatus comprising a metering assembly having a housing, a shaft rotatably mounted in said housing and extending outwardly thereof, a metering wheel mounted on said shaft for rotation therewith and extending beyond said housing to enable frictional rolling engagement with said measurement surface; a mounting assembly for mounting the metering assembly on the other of said parts and including means for movement of said wheel toward said measurement surface and retaining the wheel against the measurement surface with the plane of rotation of the wheel parallel within about two minutes of arc to the direction of the relative movement of the two parts of said device; an indicator operatively connected to the shaft exteriorly of the housing having first visual indicating means connected to indicate the rotation of the metering wheel on a first predetermined ratio, a second visual indicating means mounted on the housing to continuously indicate a second predetermined ratio defining substantially smaller increments of wheel rotation than the increments defined by the first predetermined ratio; rotary drive means interconnecting the metering wheel and second visual indicating means for faithfully amplifying at the second visual indicating means rotary motion of the wheel in response to wheel rotation in both directions; and means operatively engaging and biasing said metering assembly toward the measurement surface for independently and solely establishing, controlling and maintaining a frictional engagement of said wheel against said measurement surface with an effective amount of force of about forty pounds to overcome the inertia of the moving elements of the metering assembly throughout predetermined acceleration and deceleration as well as constant speed movement thereof to prevent slippage and produce faithful response by the first and second visual indicating means.

13. Apparatus for indicating motion between two relatively moving parts of a device, one of said parts having a measurement surface, the apparatus comprising a metering assembly having a housing, a shaft rotatably mounted in said housing and extending outwardly thereof, a metering wheel mounted on said shaft for rotation therewith and extending beyond said housing to enable frictional rolling engagement with said measurement surface; a mounting assembly for mounting the metering assembly on the other of said parts said mounting assembly including a base adapted to be rigidly affixed to the other of said parts, a carriage slidably mounted on the base to slide on a straight line normal to the measurement surface, means adapted to rigidly and removably hold the metering assembly on the base for movement of said metering assembly and said wheel toward said measurement surface with the plane of rotation of the wheel parallel within about two minutes of arc to the direction of the relative movement of the two parts of said device; an indicator operatively connected to the shaft exteriorly of the housing having first visual indicating means connected to indicate the rotation of the metering wheel on a first predetermined ratio, a second visual indicating means mounted on the housing to continuously indicate a second predetermined ratio defining substantially smaller increments of wheel rotation than the increments defined by the first predetermined ratio; rotary drive means interconnecting the metering wheel and second visual indicating means for faithfully amplifying at the second visual indicating means rotary motion of the wheel in response to wheel rotation in both directions; and means operatively engaging and biasing said metering assembly toward the measurement surface for independently and solely establishing, controlling and maintaining a frictional engagement of said wheel against said measurement surface with an effective amount of force of about forty pounds to overcome the inertia of the moving elements of the metering assembly throughout predetermined acceleration and deceleration as well as constant speed movement thereof to prevent slippage and produce faithful response by the first and second visual indicating means.

14. Apparatus according to claim 13 and wherein the means biasing the metering assembly toward the measurement surface is a helical spring housed within the base, an adjustable screw threaded in the base to bear against one end of the spring, force receiving means projecting from the metering assembly into the base to bear against the opposite end of the spring and a calibrated gauge rod extending through the spring abutting on its inner end against said force receiving means and extending at its outer end through the adjustable screw in sliding relation whereby the compression imposed on the spring by the screw is indexed by calibrations on said gauge rod.

15. Apparatus for indicating motion between two relatively moving parts of a device, one of said parts having a measurement surface, the apparatus comprising a metering assembly having a housing, a shaft rotatably mounted in said housing and extending outwardly thereof, a metering wheel mounted on said shaft for rotation therewith and extending beyond said housing to enable frictional rolling engagement with said measurement surface; a mounting assembly for mounting the metering assembly on the other of said parts for movement of said wheel toward said measurement surface with the plane of rotation of the wheel sufficiently parallel to the direction of the relative movement of the two parts of said device that the apparent travel of the metering wheel relative to the measurement surface does not depart from the actual travel of the metering wheel relative to said surface by more than 0.001 inch for each rotation of the metering wheel, an indicator operatively and continuously connected to the shaft exteriorly of the housing having first visual indicating means connected to continuously indicate the rotation of the metering wheel on a first predetermined ratio, a second visual indicating means mounted on the housing to continuously indicate a second predetermined ratio defining substantially smaller increments of wheel rotation than the increments defined by the first predetermined ratio; rotary drive means continuously interconnecting the metering wheel and second visual indicating means for causing a component of the second visual indicating means to cycle more than once for a single rotation of the metering wheel and for faithfully amplifying at the second visual indicating means rotary motion of the wheel in response to wheel rotation in both directions; and means operatively engaging and biasing said metering assembly toward the measurement surface with an effective amount of force of at least about 12 pounds for independently and solely establishing, controlling and maintaining a frictional engagement of said wheel against said measurement surface sufficient to overcome the inertia of the moving elements of the metering assembly throughout predetermined acceleration and deceleration as well as constant speed movement thereof to prevent slippage and produce faithful response by the first and second visual indicating means.

16. Apparatus for indicating motion between two relatively moving parts of a device, one of said parts having a measurement surface, the apparatus comprising a metering assembly having a housing, a shaft rotatably mounted in said housing and extending outwardly thereof, a metering wheel mounted on said shaft for rotation therewith and extending beyond said housing to enable frictional rolling engagement with said measurement surface; a mounting assembly for mounting the metering assembly on the other of said parts for movement of said wheel toward said measurement surface with the plane of rotation of the wheel sufficiently parallel to the direction of the relative movement of the two parts of said device that the apparent travel of the metering wheel relative to the measurement surface does not depart from the actual travel of the metering wheel relative to said surface by more than 0.001 inch for each rotation of the metering wheel; an indicator operatively and continuously connected to the shaft exteriorly of the housing having first visual indicating means connected to continuously indicate the rotation of the metering wheel on a first predetermined ratio, a second visual indicating means mounted on the housing to continuously indicate a second predetermined ratio defining substantially smaller increments of wheel rotation than the increments defined by the first predetermined ratio; a gear train including a plurality of meshed gears continuously interconnecting the metering wheel and second visual indicating means for causing a component of the second visual indicating means to cycle more than once for a single rotation of the metering wheel and for faithfully amplifying at the second visual indicating means rotary motion of the wheel in response to wheel rotation in both directions; resiliently biased anti-backlash means operatively coupled to said gear train for eliminating play between the meshed gears in the gear train; and means operatively engaging and biasing said metering assembly toward the measurement surface with an effective amount of force of at least about 12 pounds for independently and solely establishing, controlling and maintaining a frictional engagement of said wheel against said measurement surface sufficient to overcome the inertia of the moving elements of the metering assembly throughout predetermined acceleration and deceleration as well as constant speed movement thereof to prevent slippage and produce faithful response by the first and second visual indicating means.

17. Apparatus for precisely indicating the amount of motion between two adjacent relatively movable members of a device such as a machine tool, one of the members defining a substantially smooth measurement surface, the apparatus comprising a motion sensing and amplifying assembly including a housing and an input shaft for the assembly rotatably mounted in the housing; a motion sensing metering wheel of precision circumferential dimension secured to the input shaft for rotation directly therewith and extending beyond the housing for frictional rolling engagement with the measurement surface; a mounting assembly for mounting the motion sensing and amplifying assembly to the other of the two relatively movable members adjacent the measurement surface for movement of the metering wheel into frictional engagement with the measurement surface with the plane of rotation of the metering wheel sufficiently parallel to the direction of movement between the two members that the apparent travel of the metering wheel relative to the measurement surface does not depart from the actual travel of the metering wheel relative to said surface by more than 0.001 inch for each rotation of the metering wheel; an output shaft for the motion sensing and amplifying assembly rotatably mounted in the housing; motion indicating means operatively and continuously coupled to the output shaft to continuously indicate increments of rotation of the metering wheel; motion amplifying rotary drive means continuously coupled between the input and output shafts for faithfully amplifying at the output shaft rotation of the metering wheel in response to rotation of the wheel in both directions and for causing a component of the indicating means to cycle more than once for a single rotation of the metering wheel; and means cooperating with the mounting assembly biasing the motion sensing and amplifying assembly toward the measurement surface with an effective amount of force of at least about 12 pounds for solely establishing, controlling and maintaining frictional engagement of the metering wheel with the measurement surface sufficient to cause the metering wheel to rotate faithfully without slippage relative to the measurement surface in response to relative motion between said two members throughout predetermined acceleration and deceleration as well as constant speed movement between said two members so that the indicating means precisely indicates the extent of relative motion between the two members.

18. Apparatus according to claim 17 wherein said effective amount of force is between about 12 pounds and about 40 pounds, inclusive.

No references cited.

LEONARD FORMAN, *Primary Examiner.*